(12) United States Patent
Cogan

(10) Patent No.: US 8,407,282 B2
(45) Date of Patent: Mar. 26, 2013

(54) SYSTEMS AND METHODS FOR DETERMINING ELECTRONIC RELATIONSHIPS

(75) Inventor: Edward A. Cogan, Newton, MA (US)

(73) Assignee: Catelas Inc., Newton, MA (US)

( * ) Notice: Subject to any disclaimer, the term of this patent is extended or adjusted under 35 U.S.C. 154(b) by 427 days.

(21) Appl. No.: 12/381,570

(22) Filed: Mar. 13, 2009

(65) Prior Publication Data

US 2010/0235489 A1 Sep. 16, 2010

(51) Int. Cl.
*G06F 15/16* (2006.01)
*G06F 12/00* (2006.01)
(52) U.S. Cl. ........................................ 709/203; 709/250
(58) Field of Classification Search .................. 709/203, 709/206–207, 223–229, 250
See application file for complete search history.

(56) References Cited

U.S. PATENT DOCUMENTS

| 2003/0158855 | A1* | 8/2003 | Farnham et al. | 707/102 |
| 2004/0111479 | A1* | 6/2004 | Borden et al. | 709/206 |
| 2007/0214097 | A1* | 9/2007 | Parsons et al. | 706/12 |

* cited by examiner

*Primary Examiner* — Zarni Maung
(74) *Attorney, Agent, or Firm* — Baker & Hostetler LLP

(57) ABSTRACT

Systems and methods are provided for measuring the level of relative activity (relationship) between two entities (e.g., people, companies, organizations, etc.) in a group as compared with others in that group or in a subset of that group. A group or subset of a group can be defined manually or automatically by the program. Once the activity is measured, it is further analyzed to generate behavioral attributes (e.g., trust, respect, mutually enjoyable company or personal relationship, reciprocity and shared experience) of the relationship. These attributes may be employed to derive characteristics such as the strength of the relationship for each pair of entities. The relationships and characteristic and/or attributes may then be displayed in a simple to understand manner.

41 Claims, 3 Drawing Sheets

SYSTEMS AND METHODS FOR DETERMINING ELECTRONIC RELATIONSHIPS

FIELD OF THE INVENTION

The invention relates generally to systems and methods for determining relationships between entities who communicate over one or more networks and, more particularly, to systems and methods for analyzing communications between multiple entities and determining various attributes of those relationships.

BACKGROUND OF THE INVENTION

Advances in technology generally and networking specifically have resulted in electronic communications becoming more prevalent in modern society. Whereas historically, people would send written messages via the postal service, or place voice calls via the public switched telephone network ("PSTN") today many such communications are electronic in nature (e.g. email, instant messaging, voice over Internet Protocol ("VoIP"), etc.) As a result of this evolution to electronic communications, it has become easier to track communications between various entities.

It has long been understood that business success depends not only on what you know, but on who you know. However, while advances have been made in analyzing and leveraging institutional knowledge, very little success has been achieved in the realm of 'Human Capital' (the value of people in terms of who they know and the 'actionable knowledge' that resides in their heads). While documented information represents cold facts, 'actionable knowledge' represents the understanding that a person brings to such information and how that information can be applied to a changing environment. If such value could be leveraged at the enterprise level then such collective intelligence would yield great productivity improvements benefiting such areas as sales, product development and innovation.

In recognition of the value relationships have, companies have begun to invest in categorizing people and their relationships, for example customer relationships. However, such systems are static, limited (by product or customer) and stored in silo systems like customer relationship management ("CRM") applications, billing systems and contact databases. Thus, little value is generated from Human Capital. Cross selling opportunities go unrealized because sales representatives are not aware of relationships that exist. Innovation is staid and product development too slow because organizations are unable to leverage the collective intelligence of its employees inside, and its partners outside, the firewall—the collective 'who you know' and 'what you know'.

The following articles, existing technology and companies illustrate conventional attempts to leverage the knowledge gleaned from communications: Microsoft SNARF™, Netform™, Orgnet INFLOW™, Two Crows™, Know How Inc., Analytic Technologies™, Cyram Co. NetMiner™, The Vancouver Network Analysis Team™, IBM™, Morphix Company™, Zachman Institute™, Organization Effectiveness Consultants™, various software listed that can be found at http://www.insna.org/INSNA/soft_inf.html, an article that can be found at http://stat.gamma.rug.nl/snijders/Software%20for%20Social%20Network%20Analysis%20-CUP_ch13_Oct2003.pdf, a press release that can be found at http://www.ft.com/cms/s/0/75ece1b2-a444-11dd-8104-000077b07658.html?nclick_check=1, The Social Network Company Mindset™, Five Across™ (acquired by Cisco), Small World Labs™, Leverage Software™, Social Platform™, Ning™, KickApps™, Crowdvine™, GoingOn™, CollectiveX™, Me.com™, Broadband Mechanics PeopleAggregator™, Cerado Haystack™, OneSite™, phpFox™, GibLink™, Visible Path™, Select Minds™, Event Robot™, Web Crossing™, IntroNetworks™, Social Engine™, IBM Lotus Connections™, Contact Networks ConnectNet™, Lexis/Nexis InterAction™, Tacit ActiveNet™ and Illumino™ and Connectbeam.

It would be advantageous to provide a system for optimizing Human Capital. It would also be advantageous to provide systems and methods for optimizing Human Capital by tracking the number of communications between entities and determining information about those relationships based on the existence of those communications. It would be further advantageous to provide systems and methods for classifying relationships between entities based at least in part on the methods of communications and the volume of communications.

BRIEF SUMMARY OF THE INVENTION

Many advantages of the invention will be determined and are attained by the invention, which in a broadest sense provides systems and methods for determining aspects of a relationship based at least in part on modes of communication and a volume of communications between entities. Implementations of the invention may provide one or more of the following features.

An aspect of the invention provides a method for analyzing electronic relationships between multiple entities on a network. The method includes collecting with a server interaction information about entities on a network for a period of time and defining a relationship between at least two of the entities based at least in part on collected interaction information that involves both of the entities. The method also includes the server generating a behavioral attribute of the relationship based on interactions involving both of the entities. The method further includes the server generating a characteristic of the relationship based at least in part on the behavioral attribute and displaying the relationship and the characteristic of the relationship on a display.

Another aspect of the invention provides a method for analyzing electronic relationships between entities on a network. The method includes a server collecting interaction information about entities on a network for a period of time and defining a relationship between at least two of the entities based at least in part on collected interaction information that involves both of the entities. The server also generates a behavioral attribute of the relationship. This generation is based on interactions involving both of the entities. The method also includes displaying the relationship and the behavioral attribute of the relationship on a display.

In another aspect of the invention, a system and corresponding method are provided for analyzing electronic relationships between entities on a distributed network. The system includes a server, selectively accessible from a remote location, which is configured to collect interaction information for a period of time about entities who communicate via a network and is configured to define a relationship between at least two of the entities based at least in part on interaction information that involves both of the entities. The server is also configured to generate a behavioral attribute of the relationship based on the collected interactions involving both of the entities and to generate a characteristic of the relationship based at least in part on the behavioral attribute. The server is configured to generate data for displaying the relationship and the characteristic of the relationship. This aspect of the invention includes a server in electrical communication with the network. The server is selectively accessible from a remote location. A program is stored on the server, and the program is configured to provide data for display. The program is also configured to detect an action taken by a party (e.g. a facsimile, VoIP telephone call, email, IM, text message, join a group, facilitate an introduction, tag a photograph, etc.), to determine an aspect of a relationship between the sender and recipient based, at least in part, on the action taken by the party.

Still another aspect of the invention provides a system for analyzing electronic relationships between entities on a network. This aspect includes a server module for collecting interaction information for a period of time about entities who communicate via a network and for defining a relationship between at least two of the entities based at least in part on interaction information that involves both of the entities. The server module is configured to generate a behavioral attribute of the relationship based on the collected interactions involving both of the entities. The server module is also configured to generate a characteristic of the relationship based at least in part on the behavioral attribute and to generate data for displaying the relationship and the characteristic of the relationship.

In yet another aspect of the invention a system is provided for analyzing electronic relationships between entities on a network. This aspect provides a server, selectively accessible from a remote location, configured to collect interaction information for a period of time about entities who communicate via a network and to define a relationship between at least two of the entities based at least in part on interaction information that involves both of the entities. The server is configured to generate a behavioral attribute of the relationship based on the collected interactions involving both of the entities and to generate data for displaying the relationship and the behavioral attribute of the relationship.

A method for analyzing electronic relationships between a plurality of entities on a network, comprising:

Aspects of the invention provide collecting, with a server, interaction information about entities on a network for a period of time and defining a relationship between at least two of the entities based at least in part on collected interaction information that involves both of the entities. The method includes comparing activity of an entity to activity of another entity to determine a relative activity of each entity as compared with the other and then displaying the relative activity on a display.

Aspects of the invention also provide a system for collecting interaction information about entities on a network for a period of time and defining a relationship between at least two of the entities based at least in part on collected interaction information that involves both of the entities. The system includes computer software which resides on a computer-readable storage medium. The software includes a set of instructions for use in a computer system to cause the computer system to compare activity of an entity in communication with that computer system to activity of another entity in communication with that computer system to determine a relative activity of each entity as compared with the other. The system also includes a display configured to display the relative activity.

The invention will next be described in connection with certain illustrated embodiments and practices. However, it will be clear to those skilled in the art that various modifications, additions and subtractions can be made without departing from the spirit or scope of the claims.

BRIEF DESCRIPTION OF THE DRAWINGS

For a better understanding of the invention, reference is made to the following description, taken in conjunction with the accompanying drawings, in which like reference characters refer to like parts throughout, and in which.

The invention will next be described in connection with certain illustrated embodiments and practices. However, it will be clear to those skilled in the art that various modifications, additions, and subtractions can be made without departing from the spirit or scope of the claims.

DETAILED DESCRIPTION OF THE INVENTION

Figure 1:
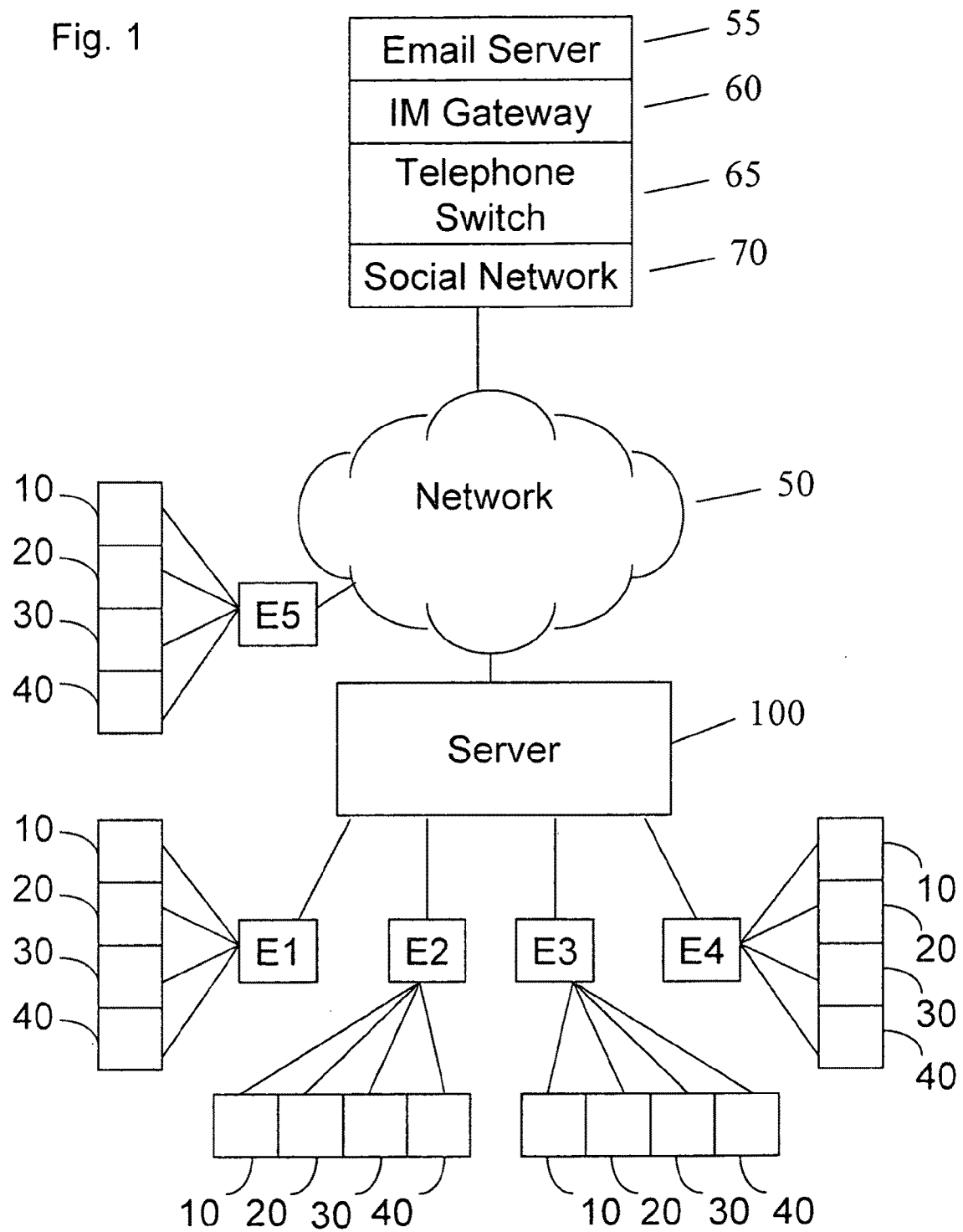
FIG. 1 is a diagram of a system for analyzing and determining relationships between entities based on electronic communications via a network (e.g., Internet) in accordance with an embodiment of the invention.
Figure 2:
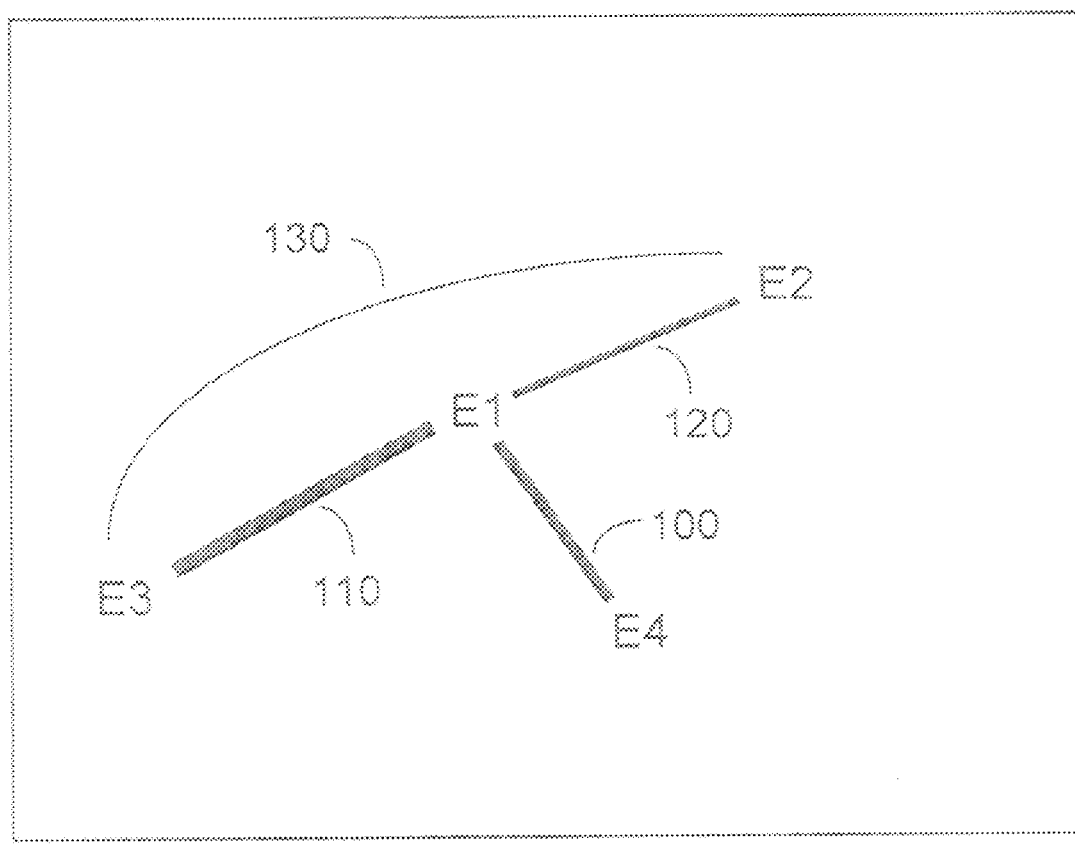
FIG. 2 is a sample display of a relationship chart determined in accordance with embodiments of the invention; and, FIG. 3 is a flow chart illustrating a method of analyzing and determining relationships between entities in accordance with embodiments of the invention.
Figure 3:
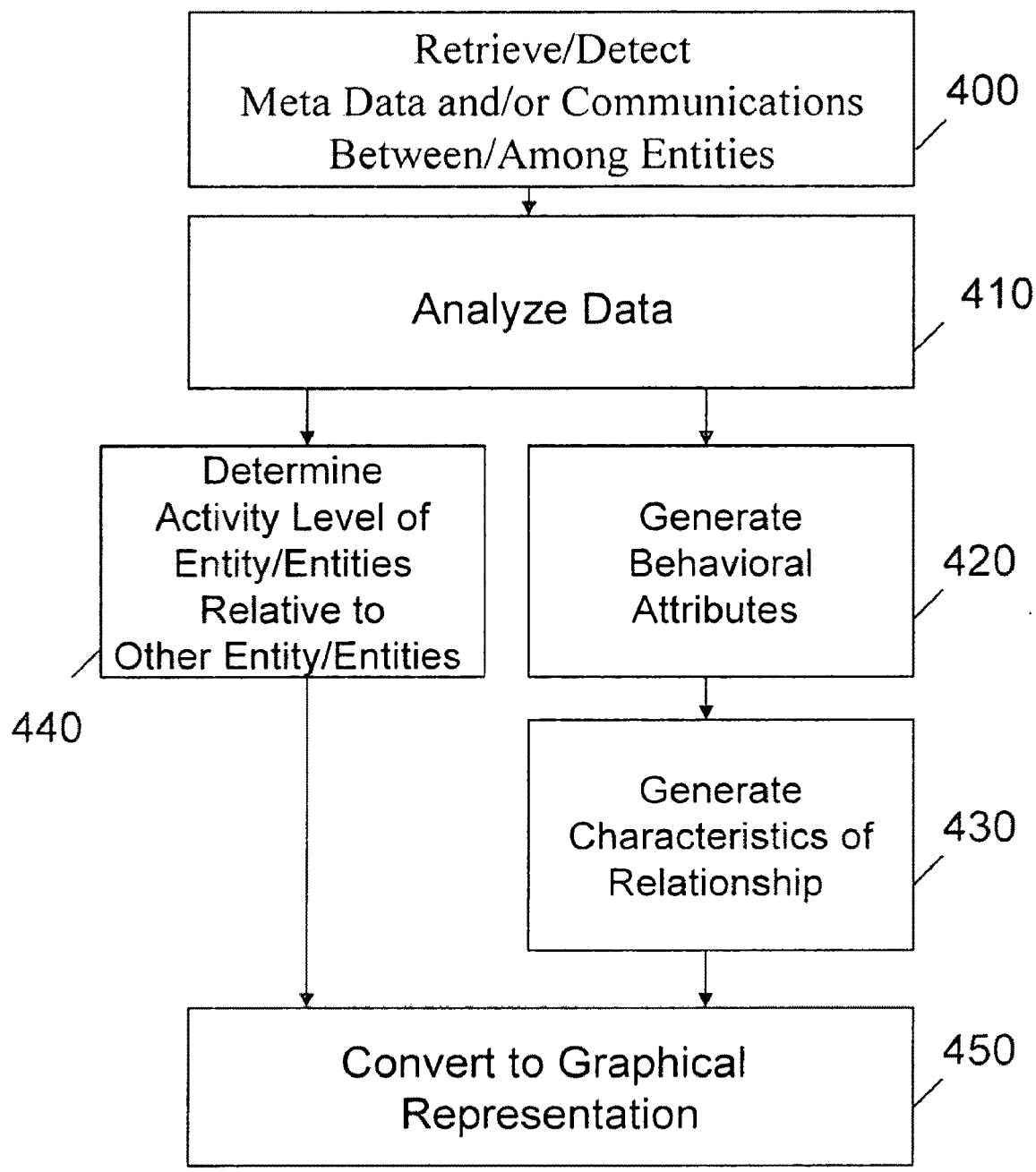

Referring to the drawings in detail wherein like reference numerals identify like elements throughout the various figures, there is illustrated in FIGS. 1-3 systems and methods of determining information about a relationship based at least in part on types and quantity of communications between the entities according to the invention. The principles and operations of the invention may be better understood with reference to the drawings and the accompanying description.

The term relationship as used herein is intended to have the broadest meaning available and may include a single relationship between two or more entities or groups of relationships. The term communication is intended to mean interaction, activity or a situation that involves or is common to at least two entities. A non-exhaustive and non-limiting list of possible communications include email between two or more entities, two or more entities joining the same group or groups, two or more entities living in the same apartment complex, an entity publishing a recommendation about one or more other entities, etc. The term entity is intended to have the broadest meaning possible and may include: people, businesses, computer files, physical products (e.g. boxes in a warehouse), instances of a medical condition, and the like.

Embodiments of the invention provide systems and methods for determining relationships and information about those relationships based at least in part on the manner and quantity of communications between entities and presenting the information in a user friendly manner. While it will be seen that a preferred manner of presenting the information is graphical, those skilled in the art will recognize that the information could also be represented as a chart or in any other format that allows easy access and understanding of the relationship information. Some of the information that may be determined by the invention includes strength of a relationship, type of relationship, value of the relationship, trust of the relationship, a distance between relationships, probability of affinity with other entities, etc. In one or more embodiments the information derived from the analysis of communications may be presented as different colored lines having various thicknesses connecting entities. Further, different types of line such as arcuate, zig-zag, straight, dashed, dotted etc. could be employed to provide different information. FIG. 2 illustrates a non-limiting example of a possible display. As illustrated. Entity 1 has a relationships 120, 110, and 100 with entities 2, 3 and 4 respectively. Entity 2 has relationships 130 and 120 with entities 1 and 3 respectively, but not with entity 4. Entity 3 has relationships 110 and 130 with entities 1 and 2 but not with entity 4 and entity 4 has a relationship 100 with entity 1 but not with entities 2 or 3. In this particular example, the strongest relationship is relationship 110 between entity 1 and entity 3 followed by relationship 100 between entity 1 and entity 4, then relationship 120 between entity 1 and entity 2 and finally by relationship 130 between entities 2 and 3. Another aspect that this particular example illustrates is that while a relationship 130 exists between entities 2 and 3, the stronger way to approach entity 2 from entity 3 is probably through the relationships 110 and 120 of entity 1.

In one or more embodiments of the invention, a determination may be made with regard to activity and anomalies. Activity detection may be employed to identify pairs or groups of individuals who interact on an ongoing basis during a particular period. That period may be user defined or may be a default period. Anomaly detection detects unusual activity between two or more entities during a particular period. While it is preferable to detect and define unusually high activity as anomalous, those skilled in the art will recognize that unusually low or no activity by one or more entities or between one or more entities in a group could also be considered anomalous without departing from the scope of the invention. Another type of anomalous behavior could include unidirectional activity between two entities who usually have bi-directional activity. In other words, where one entity interacts with another entity or entities with no responsive interaction. As with activity the period of interaction may be user defined or a default period. Anomaly detection may emphasize criminal or illicit activity or some other activity that may require further scrutiny.

A pair or group of entities have high activity if their number of interactions is high compared to a baseline for their peer group. A period of time is anomalous if the number of interactions during that period is high or low compared to a baseline for that pair of individuals over a long period.

Different time categories may be employed for activity and anomaly detection, and interactions may be counted separately for the different time categories. For example, a category may be daytime during a working week (Monday through Friday 7 am to 7 pm, non-holidays) or after work hours; another category might be weekends and holidays. Preferably, although not required, the minimum level of granularity for analysis of interactions will be a twelve hour time period or half day.

In a preferred embodiment, activity analysis is performed on a set of entities for a given period of time with interactions from each given time category weighted and summed. While a preferred method of analyzing activity is being described, the invention is not intended to be limited by this description. Those skilled in the art will recognize that other methods could be employed without departing from the scope of the invention. The analysis is based on the total number of interactions between each pair of entities during the period, during the time category. First, a table is constructed in which each row represents the number of interactions for a pair of entities for which the number is greater than zero. Second, the rows of the table are sorted in ascending order by number of interactions. Third, the rows are partitioned into different categories of interaction (low, medium, high, etc.). The maximum number of different categories is a parameter k. Each category includes a range of numbers in the sorted sequence. Therefore partitioning includes selecting at most k−1 breakpoint positions at which the sequence is divided. The partitioning is performed by applying a function (e.g. a logarithm) to the raw data (the numbers in the sorted table) or to the numbers obtained from the raw data. The resulting numbers, a[1], a[2], a[3], . . . , will be referred to as the input data. The plot of the input data, i.e. the plot of the points (i,a[i]) (i=1, 2, 3, . . . ) is then considered and at most k−1 breakpoints in the sequence of input data are located. A first set of candidate breakpoints is selected and then some are discarded as needed to reduce the number of breakpoints to k−1. An initial slope estimate is determined. For example, consider the pth point (p, a[p]) where p is a fixed fraction of the total number n of numbers in the input data. (e.g. p=n/2.) The initial slope estimate is then a[p]/p. The candidate breakpoints are called "elbows". To find the first elbow, each integer i is considered in turn, starting at i=p. For each i, the slope of the curve is calculated, starting from (i, a[i]) and passing through all subsequent points (j, a[j]) (j>i); if the slope (a[j]−a[i])/(j−i) exceeds the initial slope by at least a factor 1+delta where delta>0 is a parameter (e.g. delta=2) then i is designated the first elbow, and its slope is defined as mim {(a[j]−a[i])/(j−i):j>i}. Subsequent elbows are found similarly. Let q be the position of the last elbow found, and let s be the slope found for that elbow. Each integer i is considered in turn, starting at i=q. The next elbow occurs at the first i such that every subsequent slope (a[j]−a[i])/(j−i) is at least (1+delta) s. Once all of the elbows have been found, the elbows are iteratively eliminated until there are at most k−1. In each iteration, the remaining elbow that is eliminated is the one minimizing the ratio:

(slope after the elbow)/(slope before the elbow).

For a specific pair or group of entities, an anomaly may be a short period in which their interaction is unusually high. For a single entity, an anomaly may similarly be, a short period in which that entity's number of interactions with all others is unusually high. In a preferred embodiment, detection of anomalies is similar to analysis of activity. As with the activity determination, the following describes only a preferred method of detection. Those skilled will recognize that other methods of detection may be employed and still fall within the scope of the invention. The main difference in implementation is that rates are computed for a variety of window sizes. For example, suppose window sizes of 1, 2, 3, 4, 5, 7, 9, 11, 14, 18, 22 and 28 days. (This set has the property that any other window size less than 28 days is approximated to within 25% by a number in the list. Using this set may save time compared to just using all integers from 1 to 28). For each window size, a time category and a single entity or group of entities is fixed. The observed rate of interaction is calculated over a (configurable) long period (90 days, say) or the period for which we have data, whichever is smaller. This provides a baseline for that entity or group of entities, for that time category. This rate is compared to the rate for each of the windows for each window size. The rate for a period is the number of interactions divided by the number of days in the window period. If the rate for a window period is significantly different from the baseline rate, the window is flagged as anomalous and identified as high, medium high, average, or low. The comparison is done by looking at the probabilities for a Poisson process whose rate is the baseline rate. If for some time window the probability is very low that a random variable distributed according to the Poisson process would achieve at least/at most the rate that occurred, the period is deemed anomalous.

In various embodiments, the invention measures the level of relative activity between two entities in a group as compared with others in that group or in a subset of that group. A group or subset of a group can be defined manually using specific business data or automatically by the program. Manually defined groups might correspond to departments, geographic demarcations such as an office or region, titles or roles, family, members, friends, classmates, etc. Automatically defined groups will be generated by the program using clustering techniques to automatically assign individuals to groups. In other words, the group may be defined by indexed Meta Data or automatically by the system. Meta Data may include geographic location, title, role in the group, function or any other meta-data mined from enterprise applications or databases (e.g., CRM, sales force automation (SFA), Project Databases, etc.). The invention may automatically define a sub-group by analyzing the extent to which entities in the group are homogenously clustered.

As illustrated in FIG. 3, in order to measure the level of activity/communications between two entities, the invention may import data 400 from various sources of communication such as email transport log files and/or emails from email servers such as Microsoft Exchange Server™, Lotus Notes™ or Blackberry Exchange Server™, stand alone .pst or .nsf files, Instant Messaging ("IM") log files from IM gateway servers, transport log files from telephony switches from Avaya™, Cisco™, Nortel™ etc., Microsoft Unified Communications Platform™, Microsoft Office Communications System™, Microsoft Sharepoint™, IBM Lotus Connections™, Jive™, public or private social networking sites, blog, forums or other locations that provide information about the existence of communications between entities.

The system can "measure" the level of activity of a particular entity by counting all or some of the communications initiated by that entity, received by that entity, initiated and received by that entity or any combination thereof (e.g., the decision could depend on the nature of the communication). Additionally, the measurement could include the number of entries submitted by that entity into blogs, wikis or discussion forums, peer reviews submitted by or about the entity, referrals made by or to that entity, comments made about the entities profile or by the entity about another entity's profile, etc. In the case of medical conditions, it could also include database entries from the World Health Organization, Disease Control Centers, prescriptions databases, etc. Those skilled in the art will recognize that the above list of sources for communication information is by no means intended to be an exhaustive list, nor is it intended to be a baseline list. The scope of the invention is intended to include all systems that measure any one or more of these sources or one or more sources not mentioned above. Further, information from various sources could be collected simultaneously, serially or in groups. Preferably, although not required, communications can be weighted depending on the type of communication (e.g., IM versus email versus recommending someone, etc.) the the of the communication (e.g., time of day, time of year, time in life etc.) and/or the group the entity is communicating with and that weight taken into consideration as part of the measurement.

Once the measurement information is collected, further analysis 410 is performed on the data. Those skilled in the art will recognize that further analysis on collected data may be based on real time data collection, substantially real time, at various time intervals or after selected amounts of data are collected, without departing from the scope of the invention. Additionally, while not required, there preferably may be different time categories, and interactions may be counted separately or different time categories. For example, one category may be work days (Monday through Friday, non-holidays); another category might be weekends and holidays. Preferably, but not required, the minimum level of granularity for analysis of interactions is configurable with the default being a twelve hour half day.

In one or more embodiments, there is a single time period (e.g., thirty days) and there is a sliding window of that duration. For each pair of entities, for each time category, and for each time window, the invention will compute the interaction rate (number of interactions) between those entities during the days in that category during that time period. For computational efficiency, rather than separately computing these totals for different windows, the computation may use a sliding-window technique. By way of example, if the first computation starts with the interaction rate for entity E1 and E2 from August 1 through August 30. To obtain the interaction rate for E1 and E2 from August 2 through August 31, the interactions on August 1 are subtracted and the interactions on August 31 are added to the first computation. In this way, the interaction rate for each window can be computed from the previous window by a single subtraction and a single addition. The total rate of interaction (e.g., with all other entities) many be computed for each time category and time window. The interaction rate for each time category, each time window, and each pair of entities is compared to the interaction rates for the same time category, the same time window, and the corresponding pairs within the same group 440. Additionally the interaction rate for each pair is compared between groups 440. Similarly, the interaction rate for each entity is compared to other individuals in the same group 440.

In addition to computing regular activity by an entity, in one or more embodiments, the system may search for anomalous activity 440. For a specific pair of entities, an anomaly is a short period in which their interaction is unusually high. For a single entity, an anomaly is a short period in which that single entity's number of interactions with all others, a group of others, or with a particular medium (e.g. entries on a blog, etc.) is unusually high. Detection of anomalies is similar to analysis of regular activity. The main difference in implementation is that rates for a variety of window sizes are computed. Preferably, but not required, window sizes of 1, 2, 3, 4, 5, 7, 9, 11, 14, 18, 22 and 28 days are used. This set has the property that any other window size less than 28 is approximated to within 25% by a number in the list.

For each window size, a time category and a single entity or pair of entities is fixed. The observed rate of interaction over a relatively long period (e.g., 90 days) or the period for which data exists, whichever is smaller, is calculated. This generates a baseline for that entity or pair of entities, for that time category. This rate is compared to the rate for each of the windows for each window size. The average rate for a period is the number of interactions divided by the number of days in the window. If the average rate for a window is significantly different from the baseline rate, the window is flagged as anomalous, and it is identified as high, medium high, average, or low. The comparison is done by looking at the probabilities for a Poisson process whose rate is the baseline rate. If for some time window the probability is very low that a random variable distributed according to the Poisson process would achieve at least/at most the rate that occurred, the period is considered anomalous. For a group of entities an anomaly may be a short period in which the average number of interactions for the entire group is unusually high.

The above information is further analyzed to preferably generate 5 behavioral attributes 420: trust, respect, mutually enjoyable company or personal relationship, reciprocity and shared experience. While additional attributes could be determined from the above information, the description will be limited to these 5. However, those skilled in the art will recognize that additional behavioral attributes could be generated as well. Further, four primary characteristics are derived for each pair of entities: the strength of the relationship, the type of relationship, the nature of the relationship and the value of the relationship. Those skilled in the art will recognize that fewer than all of these, entirely different characteristics or these and additional characteristics could be derived without departing from the scope of the invention.

Respect is calculated by measuring the number of interactions whereby two entities publically support the other. Such public displays of support may occur when one entity recommends another entity, writes a peer review, introduces an entity to another entity or agrees to act as a conduit to an introduction. As there may be different degrees of respect between two entities, it may be beneficial although not required, to calculate the number of occurrences for each entity separately and compare the two results.

Trust is inferred by analyzing the extent to which two entities are connected. In addition to being connected directly the greater the number of second degree contacts two entities share, the more likely it is that they have a deep trusted relationship. The more friends of friends or colleagues of colleagues that two entities share the more connected they are and the higher extent to which they will trust each other. Trust is thus defined as the likelihood that information will be shared between entities.

Shared experience ("SE") occurs when two entities come together to accomplish something (e.g., solve a problem, collaborate on a project, work together to sell to a company etc.). This is calculated by measuring and collating the occurrences of communications bursts within communications systems, such as email, IM, telephony etc., meetings, conference calls, etc. Shared experience is calculated based on the relative intensity, duration and frequency of such bursts as well as the sum of such events.

Reciprocity is an attribute whereby two entities perform favors and support each other. These events occur when, for example, one entity recommends another, writes a peer review, introduces an entity to another or agrees to act as a conduit to an introduction. This is calculated by summing each such occurrence. As this type of transaction can typically be lopsided, it may also or alternatively be useful to determine the number of occurrences initiated by each entity and then compare the two numbers.

Mutually enjoyable company or personal relationship is simply the number of interactions between two entities. This can be calculated by counting the total number of interactions between 2 entities and dividing by 2. Again, since this may be a lopsided relationship, it may be beneficial, although not required, to calculate this number for each of the two entities separately and compare the results.

As stated above, there are 4 characteristics which are preferably derived 430 from the behavior attributes: strength of the relationship, type of relationship, nature of the relationship and value of the relationship.

The relationship strength is calculated by collating and weighting some or all of the interactions between entities. The above 5 behavioral attributes are combined in a weighted manner to yield a single value as to the strength of a relationship. Those skilled in the art will recognize that the strength of the relationship may be determined based on fewer than the 5 behavioral attributes or based on other behavioral attributes not listed. This strength may then be presented to a user of the system as a color coded graph or as a color coded chart or in any other manner that provides relatively easy interpretation. Additionally, or alternatively, any or all of the behavior attributes could be displayed in a similar manner.

The type of relationship refers to the typical organizational definition of a relationship such as your boss, your client, your partner, your peer in department A etc.

The nature of the relationship focuses on why the relationship exists. For example, is the relationship a result of a shared history such as being classmates or coworkers in a previous company or coworkers on a project.

The value of the relationship is helpful to any organization. This metric helps in the prioritization of relationships. The value of a particular relationship to a business may be determined by whether a relationship has any transactional value, such as a client sale or whether the person is a decision maker or led a successful project or managed budget. Additionally, it could be that the relationship is with an entity who acts as a network hub connecting to many other valuable entities. These entities help to increase the number of focused interactions that determine business value. Additionally, a relationship can be deemed to have high business value should it be with an entity who, through the use of social networking tools, has been seen to be of particular help to the business process—in a sense the unseen facilitator or knowledge expert of the organization who makes things happen.

FIG. 1 illustrates a simplified overview of the invention. As illustrated, various entities are connected via one or more network(s) 50 (such as the Internet, a LAN, a WAN, etc.). While only 5 entities are presented in FIG. 1, the invention may be employed with any number of entities without departing from the scope of the invention. As illustrated, each entity 1-5 may have access to one or more devices such as a computer 10, telephone 20 (Voice over Internet Protocol ("VoIP") or mobile), personal digital assistant/personal data assistant ("PDA") 30, facsimile machine or other device 40. Those skilled in the art will recognize that an entity 1-5 may have access to one, some or all of these devices at any given time.

As also illustrated in FIG. 1, various communication servers may be accessed through the one or more networks 50. These servers include Email 55, Instant Messengers 60, telephony switches 65, social networks 70 and others not mentioned. While these services have been illustrated as separate servers, those skilled in the art will recognize that one or more of these services could be provided in software on a common server or over multiple servers. Further, one skilled will recognize that while only single instance of each service has been illustrated, there can be many instances of each service.

The invention preferably resides as software on server 100, but could also reside on multiple servers, or be implemented in hardware or the like. In a preferred embodiment, software located on server 100 connects to or imports data from one or more of the communication servers 55, 60, 65, 70. Some examples of locations from which information can be imported include, but are not limited to: email transport log files from email servers such as Microsoft Exchange Server™, Lotus Notes™ or Blackberry Exchange Server™, stand alone .pst or .nsf files, Instant Messaging ("IM") log files from IM gateway servers, transport log files from telephony switches from Avaya™, Cisco™, Nortel™ etc., Microsoft Unified Communications Platform™, Microsoft Office Communications System™, Microsoft Sharepoint™, IBM Lotus Connections™, Jive™ or other locations that provide information about the existence of communications between entities.

Once the information is retrieved, the software on server 100 analyzes the information based on behavioral science, network analysis theory and data analytics. Initially, the system generates behavioral attributes (e.g. trust, respect, mutually enjoyable company, reciprocity, shared experiences, etc.). Based on these behavioral attributes, the software derives one or more characteristics about the relationships such as strength of the relationship, the type of relationship, the nature of the relationship and the value of the relationship. An entity operating a communications device 10-40, may request this information and server 100 will send the requested information for display on the display of the device 10-40. The displayed information may take the form of entity names connected by lines or arcs of different widths and/or shapes and/or numbers to indicate the various attributes and/or characteristics of the relationships. In this manner, the entity will be able to determine, among other things, the best path(s) for reaching a particular entity. For example, the display may reveal the smallest degree of separation between entities and may also show the strongest or most trusted path between entities. Those skilled in the art will recognize that the shortest path may not necessarily be the most reliable or the fastest path for one entity to communicate with another entity (illustrated in FIG. 2).

Thus it is seen that systems and methods are provided for gathering raw machine data from multiple sources like email, instant messaging and the like, processing information about each entity to calculate the primary characteristics that define relationships. This analysis yields not only connections or relationships between entities, but determines the strength of those relationships, and the context around which those relationships exist. This relationship analysis in combination with advanced social network technologies empowers organization to new levels of collaboration yielding investments in innovation, product development and sales both internal and external to an enterprise. Although particular embodiments have been disclosed herein in detail, this has been done for purposes of illustration only, and is not intended to be limiting with respect to the scope of the claims, which follow. In particular, it is contemplated by the inventor that various substitutions, alterations, and modifications may be made without departing from the spirit and scope of the invention as defined by the claims. Other aspects, advantages, and modifications are considered to be within the scope of the following claims. The claims presented are representative of the inventions disclosed herein. Other, unclaimed inventions are also contemplated. The inventors reserve the right to pursue such inventions in later claims.

Insofar as embodiments of the invention described above are implemented, at least in part, using a computer system, it will be appreciated that a computer program for implementing at least part of the described methods and/or the described systems is envisaged as an aspect of the invention. The computer system may be any suitable apparatus, system or device, electronic, optical, or a combination thereof. For example, the computer system may be a programmable data processing apparatus, a computer, a Digital Signal Processor, an optical computer or a microprocessor. The computer program may be embodied as source code and undergo compilation for implementation on a computer, or may be embodied as object code, for example.

It is also conceivable that some or all of the functionality ascribed to the computer program or computer system aforementioned may be implemented in hardware, for example by one or more application specific integrated circuits and/or optical elements. Suitably, the computer program can be stored on a carrier medium in computer usable form, which is also envisaged as an aspect of the invention. For example, the carrier medium may be solid-state memory, optical or magneto-optical memory such as a readable and/or writable disk for example a compact disk (CD) or a digital versatile disk (DVD), or magnetic memory such as disk or tape, and the computer system can utilize the program to configure it for operation. The computer program may also be supplied from a remote source embodied in a carrier medium such as an electronic signal, including a radio frequency carrier wave or an optical carrier wave.

It is accordingly intended that all matter contained in the above description or shown in the accompanying drawings be interpreted as illustrative rather than in a limiting sense. It is also to be understood that the following claims are intended to cover all of the generic and specific features of the invention as described herein, and all statements of the scope of the invention which, as a matter of language, might be said to fall there between.

Having described the invention, what is claimed as new and secured by Letters Patent is:

1. A computer-implemented method for analyzing electronic relationships between a plurality of entities on a network, comprising:
    collecting interaction information about the plurality of entities on the network for a period of time and identifying interactions indicated by the collected interaction information that involve a first entity and a second entity included in the plurality of entities;
    calculating with a computer system a degree of respect between the first and second entities based on interactions included in the interaction information in which the first entity publicly supports the second entity;
    calculating with a computer system a relationship strength between the first and second entities based at least in part on said calculated degree of respect; and,
    displaying said relationship strength on a display.

2. The method according to claim 1 wherein said network includes a plurality of networks in communication; and wherein each of said at least two of the plurality of entities is connected to a different one of the networks.

3. The method according to claim 1 wherein said collecting interaction information includes collecting interactions selected from the group of interactions consisting of emails, instant messages, telephone calls, blog entries, wiki entries, discussion forum entries, merger and acquisition activity, sales activity, social network communications, joining a common group, and network transactions.

4. The method according to claim 1 wherein displaying includes providing a graphical presentation of said relationship strength.

5. The method according to claim 1 further comprising
    calculating with the computer system for each pair of entities included in the plurality of entities a degree of respect between the pair of entities based on interactions included in the interaction information in which one of the pair of entities publicly supports the other of the pair of entities;
    calculating with the computer system for each of the pairs of entities a relationship strength between the pair entities based at least in part on the degree of respect calculated for the pair of entities; and
    simultaneously displaying a plurality of the relationship strengths calculated for the pairs of entities.

6. The method according to claim 1 wherein said period of time is a sliding window of time.

7. The method according to claim 1, further comprising:
    calculating with said computer system a trust value between the first and second entities based on first degree contacts indicated by the interaction information, each first degree contact corresponding to an intermediate entity included in the plurality of entities which directly interacted with both the first and second entities, and second degree contacts indicated by the interaction information, each second degree contact corresponding to a connection through two intermediate entities included in the plurality of entities such that the first entity has directly interacted with a first intermediate entity, the second entity has directly interacted with a second intermediate entity, and the first intermediate entity has directly interacted with the second intermediate entity;

wherein the relationship strength is calculated with said computer system based at least in part on a weighted combination of the calculated degree of respect and the calculated trust value.

8. The method according to claim 7, further comprising:
measuring with said computer system occurrences of communications bursts between the first and second entities indicated by the interaction information;
calculating with said computer system a shared experience value between the first and second entities based on relative intensity, duration, and frequency of the measured occurrences of communications bursts;
wherein the relationship strength is calculated with said computer system based at least in part on a weighted combination of the calculated degree of respect, the calculated trust value, and the calculated shared experience value.

9. The method according to claim 8, wherein
a weighting of the calculated degree of respect, the calculated trust value, and the calculated shared experience value is dependent upon a type of communication between the first and second entities.

10. The method according to claim 1, further comprising:
measuring with said computer system occurrences of communications bursts between the first and second entities indicated by the interaction information;
calculating with said computer system a shared experience value between the first and second entities based on relative intensity, duration, and frequency of the measured occurrences of communications bursts;
wherein the relationship strength is calculated with said computer system based at least in part on a weighted combination of the calculated degree of respect and the calculated shared experience value.

11. A computer-implemented method for analyzing electronic relationships between a plurality of entities on a network, comprising:
collecting interaction information about the plurality of entities on the network for a period of time and identifying interactions indicated by the collected interaction information that involve a first entity and a second entity included in the plurality of entities;
calculating with a computer system a trust value between the first and second entities based on first degree contacts indicated by the interaction information, each first degree contact corresponding to an intermediate entity included in the plurality of entities which directly interacted with both the first and second entities, and second degree contacts indicated by the interaction information, each second degree contact corresponding to a connection through two intermediate entities included in the plurality of entities such that the first entity has directly interacted with a first intermediate entity, the second entity has directly interacted with a second intermediate entity, and the first intermediate entity has directly interacted with the second intermediate entity;

calculating with said computer system a relationship strength between the first and second entities based at least in part on said calculated trust value; and,
displaying said relationship strength on a display.

12. The method according to claim 11 wherein said network includes a plurality of networks in communication; and wherein each of said at least two of the plurality of entities is connected to a different one of the networks.

13. The method according to claim 11 wherein said collecting interaction information includes collecting interactions selected from the group of interactions consisting of emails, instant messages, telephone calls, blog entries, wiki entries, discussion forum entries, and social network communications.

14. The method according to claim 11 wherein said displaying includes providing a graphical presentation of said relationship strength.

15. The method according to claim 11 further comprising
calculating with the computer system for each pair of entities included in the plurality of entities a trust value between the pair of entities based on first degree contacts indicated by the interaction information, each first degree contact corresponding to an intermediate entity included in the plurality of entities which directly interacted with both of the pair of entities, and second degree contacts indicated by the interaction information, each second degree contact corresponding to a connection through two intermediate entities included in the plurality of entities such that one of the pair of entities has directly interacted with a first intermediate entity, the other of the pair of entities has directly interacted with a second intermediate entity, and the first intermediate entity has directly interacted with the second intermediate entity,
calculating with the computer system for each of the pairs of entities a relationship strength between the pair entities based at least in part on the trust value calculated for the pair of entities; and
simultaneously displaying a plurality of the relationship strengths calculated for the pairs of entities.

16. The method according to claim 11 wherein said period of time is a sliding window of time.

17. The method according to claim 11, further comprising:
measuring with said computer system occurrences of communications bursts indicated by the interaction information;
calculating with said computer system a shared experience value between the first and second entities based on relative intensity, duration, and frequency of the measured occurrences of communications bursts;
wherein the relationship strength is calculated with said computer system based at least in part on a weighted combination of the calculated trust value and the calculated shared experience value.

18. The method according to claim 11, wherein
first degree contacts are weighted based on the identities of their respective intermediate entities, and
second degree contacts are weighted based on the identities of their respective first and second intermediate entities.

19. A system for analyzing electronic relationships between a plurality of entities on a network, comprising:
a computer system, selectively accessible from a remote location, configured to collect interaction information for a period of time about the plurality of entities who communicate via the network and configured to identify interactions indicated by the interaction information that involve a first entity and a second entity included in the plurality of entities;

said computer system being configured to calculate a degree of respect between the first and second entities based on interactions included in the interaction information in which the first entity publicly supports the second entity;

said computer system being configured to calculate a relationship strength between the first and second entities based at least in part on said calculated degree of respect; and said computer system being configured to generate data for displaying said relationship strength.

20. The system according to claim 19, further comprising a display located remote from said computer system, configured to receive said display data generated by said computer system and display said relationship strength.

21. The system according to claim 19, wherein said computer system is selectively accessible from a plurality of remote locations; and wherein said computer system is accessible from at least one of the plurality of remote locations via a network and from another of the plurality of remote locations via another network.

22. The system according to claim 19, wherein said computer system is configured to calculate a trust value between the first and second entities based on first degree contacts indicated by the interaction information, each first degree contact corresponding to an intermediate entity included in the plurality of entities which directly interacted with both the first and second entities, and second degree contacts indicated by the interaction information, each second degree contact corresponding to a connection through two intermediate entities included in the plurality of entities such that the first entity has directly interacted with a first intermediate entity, the second entity has directly interacted with a second intermediate entity, and the first intermediate entity has directly interacted with the second intermediate entity; and said computer system is configured to calculate the relationship strength based at least in part on a weighted combination of the calculated degree of respect and the calculated trust value.

23. The system according to claim 22, wherein said computer system is configured to measure occurrences of communications bursts between the first and second entities indicated by the interaction information;

said computer system is configured to calculate a shared experience value between the first and second entities based on relative intensity, duration, and frequency of the measured occurrences of communications bursts;

said computer system is configured to calculate the relationship strength based at least in part on a weighted combination of the calculated degree of respect, the calculated trust value, and the calculated shared experience value.

24. The method according to claim 23, wherein a weighting of the calculated degree of respect, the calculated trust value, and the calculated shared experience value is dependent upon a type of communication between the first and second entities.

25. The system according to claim 19, wherein said computer system is configured to measure occurrences of communications bursts between the first and second entities indicated by the interaction information;

said computer system is configured to calculate a shared experience value between the first and second entities based on relative intensity, duration, and frequency of the measured occurrences of communications bursts;

said computer system is configured to calculate the relationship strength based at least in part on a weighted combination of the calculated degree of respect and the calculated shared experience value.

26. A system for analyzing electronic relationships between a plurality of entities on a network, comprising:

a computer system, selectively accessible from a remote location, configured to collect interaction information for a period of time about the plurality of entities who communicate via the network and configured to identify interactions indicated by the interaction information that involve a first entity and a second entity included in the plurality of entities;

said computer system being configured to calculate a trust value between the first and second entities based on first degree contacts indicated by the interaction information, each first degree contact corresponding to an intermediate entity included in the plurality of entities which directly interacted with both the first and second entities, and second degree contacts indicated by the interaction information, each second degree contact corresponding to a connection through two intermediate entities included in the plurality of entities such that the first entity has directly interacted with a first intermediate entity, the second entity has directly interacted with a second intermediate entity, and the first intermediate entity has directly interacted with the second intermediate entity;

said computer system being configured to calculate a relationship strength between the first and second entities based at least in part on said calculated trust value; and said computer system being configured to generate data for displaying said relationship strength.

27. The system according to claim 26, further comprising a display located remote from said computer system, configured to receive said display data generated by said computer system and display said relationship strength.

28. The system according to claim 26, wherein said computer system is selectively accessible from a plurality of remote locations; and wherein said computer system is accessible from at least one of the plurality of remote locations via a network and from another of the plurality of remote locations via another network.

29. The system according to claim 26, wherein said computer system is configured to measure occurrences of communications bursts between the first and second entities indicated by the interaction information;

said computer system is configured to calculate a shared experience value between the first and second entities based on relative intensity, duration, and frequency of the measured occurrences of communications bursts;

said computer system is configured to calculate the relationship strength based at least in part on a weighted combination of the calculated trust value and the calculated shared experience value.

30. The system according to claim 26, wherein first degree contacts are weighted based on the identities of their respective intermediate entities, and second degree contacts are weighted based on the identities of their respective first and second intermediate entities.

31. A computer-implemented method for analyzing electronic relationships between a plurality of entities on a network, comprising:

collecting interaction information about the plurality of entities on the network for a period of time and identifying interactions indicated by the collected interaction information that involve a first entity and a second entity included in the plurality of entities;

measuring with said computer system occurrences of communications bursts between the first and second entities indicated by the interaction information;

calculating with said computer system a shared experience value between the first and second entities based on relative intensity, duration, and frequency of the measured occurrences of communications bursts;

calculating with said computer system a relationship strength between the first and second entities based at least in part on said calculated shared experience value; and, displaying said relationship strength on a display.

32. The method according to claim 31 wherein said network includes a plurality of networks in communication; and wherein each of said at least two of the plurality of entities is connected to a different one of the networks.

33. The method according to claim 31 wherein said collecting interaction information includes collecting interactions selected from the group of interactions consisting of emails, instant messages, telephone calls, blog entries, wiki entries, discussion forum entries, merger and acquisition activity, sales activity, social network communications, joining a common group, and network transactions.

34. The method according to claim 32 wherein displaying includes providing a graphical presentation of said relationship strength.

35. The method according to claim 31 further comprising
measuring with said computer system occurrences of communications bursts between each pair of entities included in the plurality of entities indicated by the interaction information;

calculating with the computer system for each of the pairs of entities a shared experience value between the pair of entities based on relative intensity, duration, and frequency of the measured occurrences of communications bursts between the pair of entities;

calculating with the computer system for each of the pairs of entities a relationship strength between the pair entities based at least in part on the degree of respect calculated for the pair of entities; and simultaneously displaying a plurality of the relationship strengths calculated for the pairs of entities.

36. The method according to claim 31 wherein said period of time is a sliding window of time.

37. A system for analyzing electronic relationships between a plurality of entities on a network, comprising:
a computer system, selectively accessible from a remote location, configured to collect interaction information for a period of time about the plurality of entities who communicate via the network and configured to identify interactions indicated by the interaction information that involves a first entity and a second entity included in the plurality of entities;

said computer system being configured to measure occurrences of communications bursts between the first and second entities indicated by the interaction information;

said computer system being configured to calculate a shared experience value between the first and second entities based on relative intensity, duration, and frequency of the measured occurrences of communications bursts;

said computer system being configured to calculate a relationship strength between the first and second entities based at least in part on said calculated shared experience value; and said computer system being configured to generate data for displaying said relationship strength.

38. The system according to claim 37, further comprising a display located remote from said computer system, configured to receive said display data generated by said computer system and display said relationship strength.

39. The system according to claim 37, wherein said computer system is selectively accessible from a plurality of remote locations; and wherein said computer system is accessible from at least one of the plurality of remote locations via a network and from another of the plurality of remote locations via another network.

40. A computer-implemented method for analyzing electronic relationships between a plurality of entities on a network, comprising:
collecting interaction information about the plurality of entities on the network for a period of time and identifying interactions indicated by the collected interaction information that involve a first entity and a second entity included in the plurality of entities;

calculating with a computer system a reciprocity value between the first and second entities based on interactions included in the interaction information in which the first entity performs a favor for the second entity;

calculating with the computer system a relationship strength between the first and second entities based at least in part on said calculated reciprocity value; and, displaying said relationship strength on a display.

41. A system for analyzing electronic relationships between a plurality of entities on a network, comprising:
a computer system, selectively accessible from a remote location, configured to collect interaction information for a period of time about the plurality of entities who communicate via the network and configured to identify interactions indicated by the interaction information that involve a first entity and a second entity included in the plurality of entities;

said computer system being configured to calculate a reciprocity value between the first and second entities based on interactions included in the interaction information in which the first entity performs a favor for the second entity;

said computer system being configured to calculate a relationship strength between the first and second entities based at least in part on said calculated reciprocity value; and said computer system being configured to generate data for displaying said relationship strength.

* * * * *